United States Patent
Lin et al.

(10) Patent No.: US 11,175,183 B2
(45) Date of Patent: Nov. 16, 2021

(54) SPECTRAL IMAGING DEVICE

(71) Applicant: National Taiwan University, Taipei (TW)

(72) Inventors: Ching-Fuh Lin, Taipei (TW); Ta-Jung Lin, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 16/861,613

(22) Filed: Apr. 29, 2020

(65) Prior Publication Data

US 2021/0223103 A1     Jul. 22, 2021

(30) Foreign Application Priority Data

Jan. 21, 2020  (TW) .................... 109102127

(51) Int. Cl.
| | |
|---|---|
| *G01J 3/28* | (2006.01) |
| *G01J 3/10* | (2006.01) |
| *G01J 3/12* | (2006.01) |
| *G01J 3/02* | (2006.01) |

(52) U.S. Cl.
CPC ........... *G01J 3/2823* (2013.01); *G01J 3/0208* (2013.01); *G01J 3/10* (2013.01); *G01J 3/12* (2013.01); *G01J 2003/1213* (2013.01); *G01J 2003/2826* (2013.01)

(58) Field of Classification Search
None
See application file for complete search history.

(56) References Cited

U.S. PATENT DOCUMENTS

| | | | | |
|---|---|---|---|---|
| 5,534,694 A | * | 7/1996 | Ball .................... | G01J 1/26 250/330 |
| 5,602,394 A | * | 2/1997 | Dombrowski ........ | G01J 3/2823 250/334 |
| 6,373,073 B1 | * | 4/2002 | Clancy ................. | G02B 26/008 250/504 R |
| 10,412,286 B2 | * | 9/2019 | Moggridge .......... | H04N 5/2353 |
| 10,871,395 B2 | * | 12/2020 | Nesbitt ................ | G01J 3/32 |
| 2003/0032366 A1 | * | 2/2003 | Cerni .................. | G01N 21/314 451/5 |
| 2007/0219367 A1 | * | 9/2007 | Shchepinov .......... | C12Q 1/6874 536/25.32 |
| 2009/0046287 A1 | * | 2/2009 | Haught ................. | G01N 21/05 356/319 |
| 2011/0102790 A1 | * | 5/2011 | Haught ................ | G01N 21/645 356/319 |
| 2011/0108721 A1 | * | 5/2011 | Ford .................... | G01J 3/08 250/269.1 |
| 2019/0033194 A1 | * | 1/2019 | DeFreez ............. | G01N 15/1456 |
| 2019/0182440 A1 | * | 6/2019 | Xin .................... | G01J 3/10 |

FOREIGN PATENT DOCUMENTS

JP       2000039572 A  *  2/2000

\* cited by examiner

*Primary Examiner* — Shawn Decenzo
(74) *Attorney, Agent, or Firm* — Donald E. Stout; Stout, Uxa & Buyan, LLP (57) ABSTRACT

The present invention provides a spectral imaging device characterized in that N images are captured with ambient light, and spectra can be obtained from the captured N images for spectral analysis. In particular, a filter device is employed to divide a spectral range of the ambient light into N spectral bands, and each capture corresponds to one spectral band.

18 Claims, 7 Drawing Sheets

SPECTRAL IMAGING DEVICE

CROSS-REFERENCE TO RELATED APPLICATIONS

The entire contents of Taiwan Patent Application No. 109102127, filed on Jan. 21, 2020, from which this application claims priority, are expressly incorporated herein by reference.

BACKGROUND OF THE INVENTION

1. Field of the Invention

The present invention relates to a spectral imaging device capable of analyzing spectra with high resolution.

2. Description of Related Art

Hyperspectral imaging, also known as multispectral imaging, uses three approaches in the past. The first approach employs a camera with multiple lenses, and each lens uses a filter to pass a specific wavelength band so that a photo corresponding to the specific wavelength band can be captured by the camera. This approach is costly as it requires multiple lenses and multiple filters. In order to lower the cost, the number of lenses and filters is limited to ten, and this will result in an insufficient spectral resolution. In addition, to achieve high spectral resolution, the passband of the filter coating must be very narrow, which is not easy to manufacture and also increases costs. The second approach is to combine several cameras, each with a filter to filter a specific band. This approach is more expensive than the first. Considering the cost, a small number of cameras are used and lead to an insufficient spectral resolution. The third approach employs a beam splitting device such as a prism or a filter wheel to reduce costs. This approach requires a large entire optical mechanism, in which a longer time is required to perform complicated mechanical motions for capturing the photos. This is inconvenient for a field that requires real-time data. In addition, to form an overall hyperspectral image, the three multispectral imaging approaches require many mechanical motions, which may result in shifts between image pixels, and hence a poor image quality.

For the above reasons, a new approach needs to be conceived to use and promote multispectral technology in a more convenient and lower cost manner.

SUMMARY OF THE INVENTION

An object of the present invention is to provide an imaging device that can analyze spectra from the taken photographs with improved spectral resolution.

According to an embodiment of the present invention, a spectral imaging device is provided with a light source, an object, an image sensor, and a filter device. The image sensor is used to capture images of the object. The object reflects the light source to form a reflected light. The filter device is disposed between the object and the image sensor, and the reflected light passes through the filter device and then is irradiated on the image sensor. The filter device comprises a first filter and a second filter. The first filter includes a plurality of first filter structures, and the second filter includes a plurality of second filter structures. During a period of time the image sensor continuously captures N images of the object over a spectral range, and the spectral range is divided into N spectral bands. Each captured image corresponds to one of the spectral bands. During the period of time, the plurality of first filter structures and/or the plurality of second filter structures are moved such that each of the spectral bands is an intersection of a passband of one of the first filter structures and a passband of one of the second filter structures.

In some embodiments, the spectral imaging device further includes a lens module disposed between the object and the filter device or between the filter device and the image sensor.

By the spectral imaging devices provided by the present invention, the bandwidth of each spectral band can be very narrow, typically less than 10 nm or ranges from 2 nm to 5 nm. In addition, the spectral imaging device is small in size and light in weight, which is convenient for users to carry and operate.

DETAILED DESCRIPTION OF THE PREFERRED EMBODIMENT

Reference will now be made in detail to those specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components. Wherever possible, the same or similar reference numbers are used in drawings and the description to refer to the same or like parts.

Figure 1A:
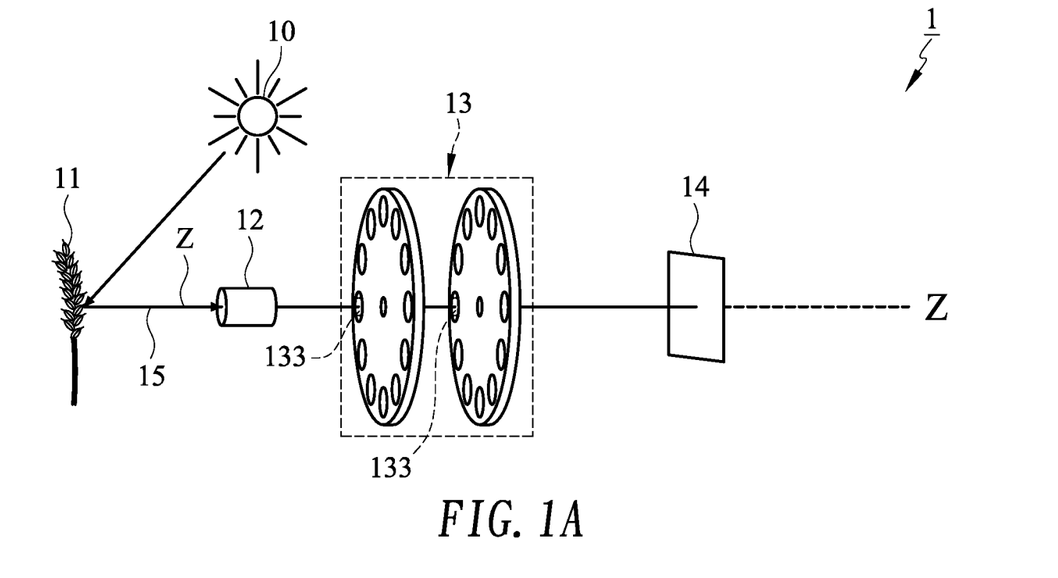
FIG. 1A is a schematic diagram of a spectral imaging device in accordance with an embodiment of the present invention.
Figure 1B:
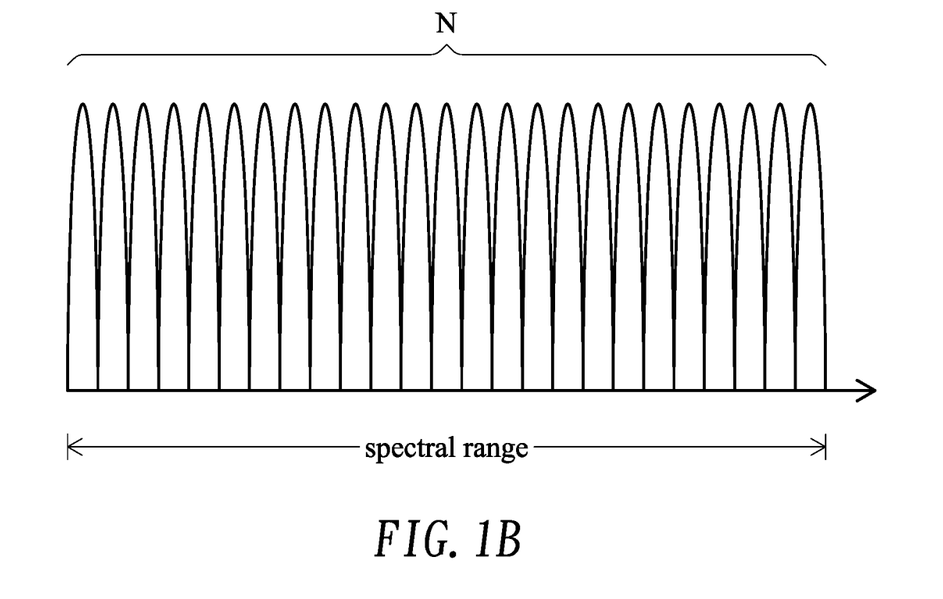
FIGS. 1B and 1C are schematic diagrams illustrating the operation of a filter device in the spectral imaging device in accordance with an embodiment of the invention.
Figure 1C:
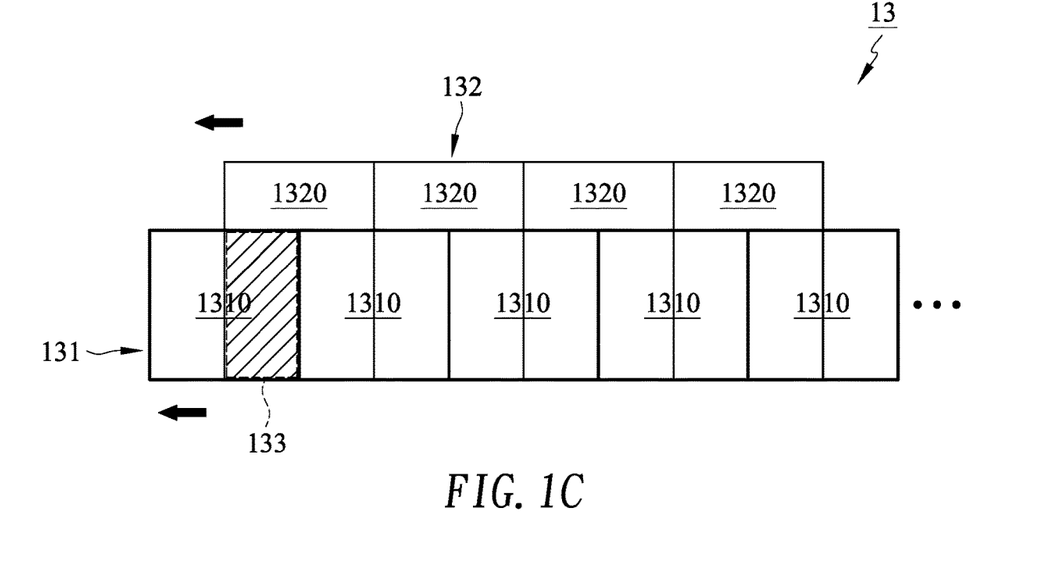

FIGS. 1A to 1C are schematic diagrams showing a spectral imaging device 1 and its principle in accordance with an embodiment of the present invention. As shown in FIG. 1A, the spectral imaging device 1 may include a light source 10, an object 11, a lens module 12, a filter device 13, and an image sensor 14. Preferably, the light source 10 is ambient light, such as sunlight or a general lighting source. The light source 10 is irradiated on the object 12 and is reflected through the lens module 12 to form a reflected light 15 having an optical axis Z-Z. The reflected light 15 passes through the filter device 13 and is finally focused on the image sensor 14 of a focal plane. In another embodiment, an additional lens module (not shown, composed of one or more lenses) is further provided between the filter device 13 and the image sensor 14. In another embodiment, the lens module 12 is disposed between the filter device 13 and the image sensor 14 instead of being disposed between the object 12 and the filter device 13. The filter device 13 is merely shown as an example, and it is not limited to the structure disclosed in the figure.

Referring to FIGS. 1A and 1B, during a period of time (usually no more than 1 second) the image sensor 14 continuously captures N images of the object 10 over a spectral range of the light source. The filtering device 13 dynamically divides the spectral range into N spectral bands, and each time an image is captured and corresponds to one spectral band. In some embodiments, a bandwidth of each spectral band is less than or equal to 10 nm. In some embodiments, a bandwidth of each spectral band ranges from 2 nm to 5 nm.

Referring to FIGS. 1A to 1C, the filter device 13 is composed of at least two filters, for example, a first filter 131 and a second filter 132. The first filter 131 includes a plurality of first filter structures 1310, and the second filter 132 includes a plurality of second filter structures 1320. The reflected light 15 passes through a region 133 of the filter device 13. During the period of time, the first filter 131 or the second filter 132 moves with time, or both move with time and the moving direction of the two can be the same or different. In this way, each spectral band is the intersection of the passband of one of the first filter structures 1310 and the passband of one of the second filter structures 1320. The spectral imaging device 1 may include a processor (not shown) to control movements of the first filter 131 and the second filter 132. Several examples are given below for explanation.

Figure 2:
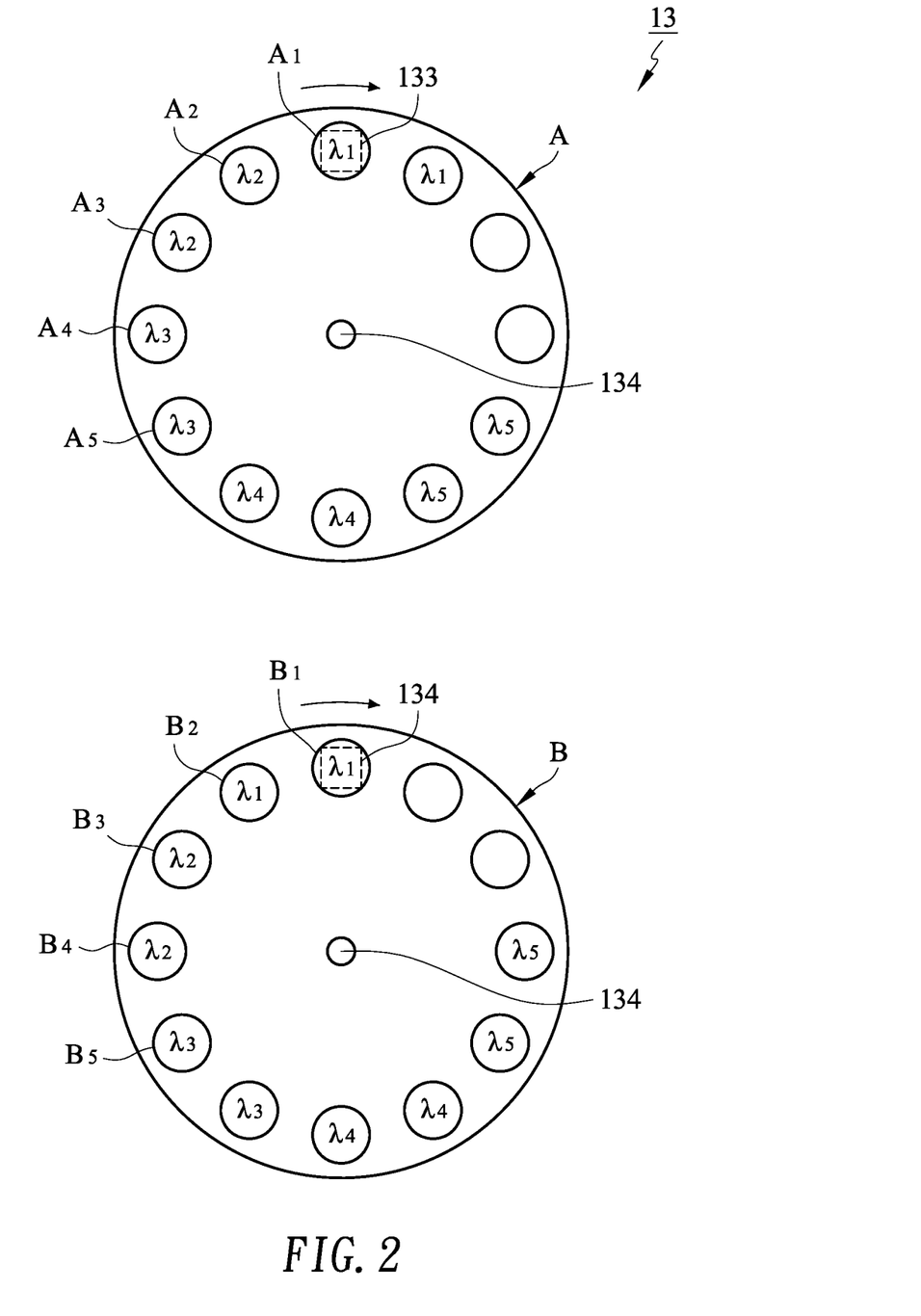
FIG. 2 is a schematic diagram of a filter device in accordance with an embodiment of the present invention.

FIG. 2 shows a filter device 13 in accordance with an embodiment of the present invention. In this embodiment, the filter device 13 includes a first wheel A, a second wheel B, and a shaft 134. The first wheel A includes a plurality of first filter coating A1, A2, A3, A4, A5, . . . , and the second wheel B includes a plurality of second filter coatings B1, B2, B3, B4, B5, . . . . The first wheel A and the second wheel B may have the same size and overlap with each other. In this embodiment, the first wheel A and the second wheel B are both disposed on the shaft 134 and rotate in the same direction, for example, rotating clockwise. In another embodiment, the second wheel B is disposed on another shaft (not shown), and the rotating direction of the first wheel A differs from that of the second wheel B. In another embodiment, the first wheel A or the second wheel B does not rotate. Thereby, during the period of time, each spectral band is the intersection of the passband of one of the first filter coatings and the passband of one of the second filter coatings. The spectral imaging 1 may include a processor (not shown) to control the rotation of the first wheel A and the second wheel B.

For example, if the spectral range is from 400 nm to 700 nm and the filter device 13 divides the spectral range into 100 spectral bands (N=100), the bandwidth of each spectral band is 3 nm. As shown and listed in the example of FIG. 2 and Table 1, the reflected light 15 passes through a fixed region 133 of the first wheel A and the second wheel B. At time T=1, the reflected light passes through the first filter coating A1 of the first wheel A and then passes through the second filter coating B1 of the second wheel B, and the range of wavelengths allowed to pass through the filter device 13 is the intersection of the passband ($A_{\lambda 1}$) of the first filter coating A1 and the passband ($B_{\lambda 1}$) of the second filter coating B1, i.e., $A_{\lambda 1} \cap B_{\lambda 1}$. Where the passband $A_{\lambda 1}$ is the range of wavelengths allowed to pass through the first filter coating A1, and the passband $B_{\lambda 1}$ is the range of wavelengths allowed to pass through the second filter coating B1. The image sensor 14 captures the first image at this time.

The first wheel A is rotated clockwise. At time T=2, the first filter coating A2 having the passband $A_{\lambda 2}$ is moved to the region 133. The second wheel B is also rotated clockwise, and at time T=2 the second filter B2 having the passband $B_{\lambda 1}$ is moved to the region 133. At time T=2, the reflected light passes through the first filter coating A2 of the first wheel A and then passes through the second filter coating B1 of the second wheel B, and the range of wavelengths allowed to pass through the filter device 13 is the intersection of the passband ($A_{\lambda 2}$) of the first filter coating A2 and the passband ($B_{\lambda 1}$) of the second filter coating B1, i.e., $A_{\lambda 2} \cap B_{\lambda 1}$, and the image sensor 14 captures a second image. Similarly, at time T=3, 4, and 5, the range of wavelengths allowed to pass through the filter device 13 are $A_{\lambda 2} \cap B_{\lambda 2}$, $A_{\lambda 3} \cap B_{\lambda 2}$, $A_{\lambda 3} \cap B_{\lambda 3}$, respectively. The passbands of the filter coatings in the first wheel A and the second wheel B are not limited to that described in the embodiment. The mentioned spectral range and the number N of spectral bands are merely examples. In one embodiment, the spectral range is from 400 nm to 1000 nm, and the filter device 13 divides the spectral range into 200 spectral bands (N=200), and the bandwidth of each spectral band is 3 nm.

TABLE 1

| Time | T = 1 | T = 2 | T = 3 | T = 4 | T = 5 | ... |
|---|---|---|---|---|---|---|
| passband of A | $A_{\lambda,1}$ Ex: 397~403 nm | $A_{\lambda,2}$ Ex: 403~409 nm | $A_{\lambda,2}$ Ex: 403~409 nm | $A_{\lambda,3}$ Ex: 409~415 nm | $A_{\lambda,3}$ Ex: 409~415 nm | ... |
| passband of B | $B_{\lambda,1}$ Ex: 400~406 nm | $B_{\lambda,1}$ Ex: 400~406 nm | $B_{\lambda,2}$ Ex: 406~412 nm | $B_{\lambda,2}$ Ex: 406~412 nm | $B_{\lambda,3}$ Ex: 412~418 nm | ... |
| Passband of A∩B | $A_{\lambda,1} \cap B_{\lambda,1}$ Ex: 400~403 nm | $A_{\lambda,2} \cap B_{\lambda,1}$ Ex: 403~406 nm | $A_{\lambda,2} \cap B_{\lambda,2}$ Ex: 406~409 nm | $A_{\lambda,3} \cap B_{\lambda,2}$ Ex: 409~412 nm | $A_{\lambda,3} \cap B_{\lambda,3}$ Ex: 412~415 nm | ... |

Figure 3:
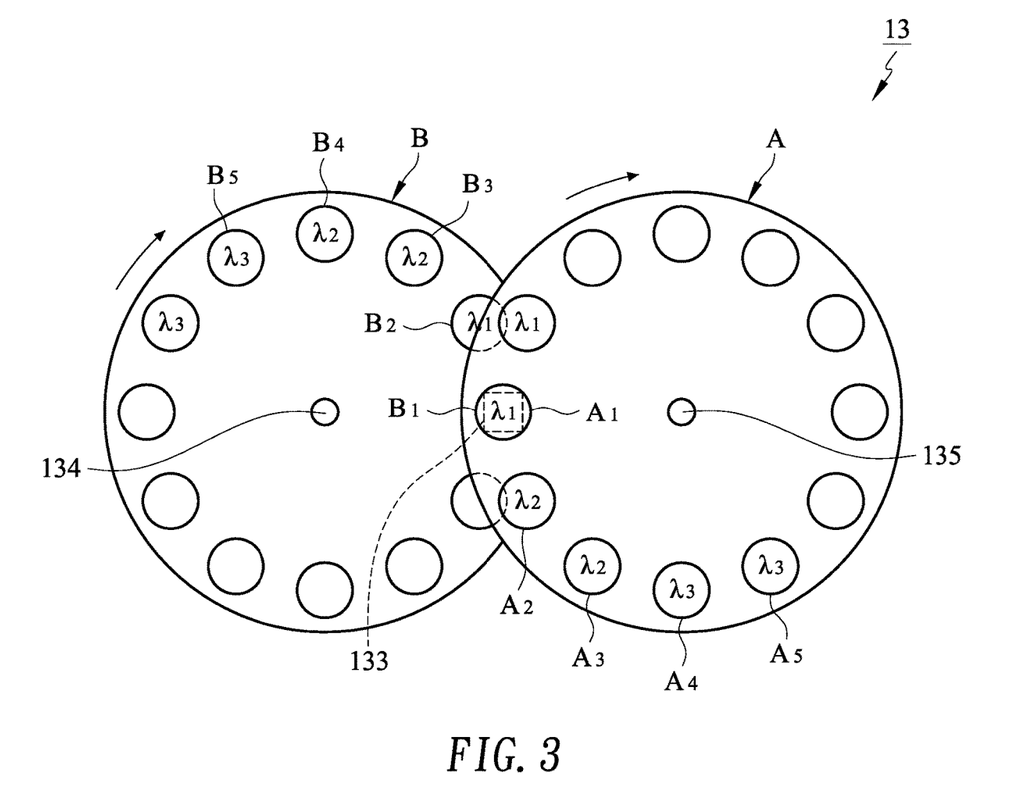
FIG. 3 is a schematic diagram of a filter device in accordance with another embodiment of the present invention.

FIG. 3 shows a filter device 13 in accordance with another embodiment of the invention. In this embodiment, the filter device 13 also includes a first wheel A and a second wheel B, but the difference from FIG. 2 is that the first wheel A and the second wheel B are not mounted on a concentric shaft. Instead, the first wheel A is provided on the 134, and the second wheel B is provided on a shaft 135. For convenience of explanation, the passband of each filter coating of the first wheel A and the second wheel B is the same as that of FIG. 2. Therefore, the operation is also similar to FIG. 2. At time T=1, the reflected light passes through the first filter coating A1 of the first wheel A and then passes through the second filter coating B1 of the second wheel B, and the range of wavelengths allowed to pass through the filter device 13 is the intersection of the passband ($A_{\lambda,1}$) of the first filter coating A1 and the passband ($B_{\lambda,1}$) of the second filter coating B1, i.e., $A_{\lambda,1} \cap B_{\lambda,1}$. The image sensor 14 captures a first image at this time. At time T=2, the first filter coating A2 having the passband $A_{\lambda,2}$ is moved to the region 133. The second wheel B is also rotated clockwise, and at time T=2 the second filter coating B2 having the passband $B_{\lambda,1}$ is moved to the region 133. At time T=2, the reflected light passes through the first filter coating A2 of the first wheel A and then passes through the second filter coating B1 of the second wheel B, and the range of wavelengths allowed to pass through the filter device 13 is the intersection of the passband ($A_{\lambda,2}$) of the first filter coating A2 and the passband ($B_{\lambda,1}$) of the second filter coating B1, i.e., $A_{\lambda,2} \cap B_{\lambda,1}$, and the image sensor 14 captures a second image. Similarly, at time T=3, 4, and 5, the range of wavelengths allowed to pass through the filter device 13 are $A_{\lambda,2} \cap B_{\lambda,2}$, $A_{\lambda,3} \cap B_{\lambda,2}$, $A_{\lambda,3} \cap B_{\lambda,3}$, respectively. The spectral imaging 1 may include a processor (not shown) to control the rotation of the first wheel A and the second wheel B.

Figure 4:
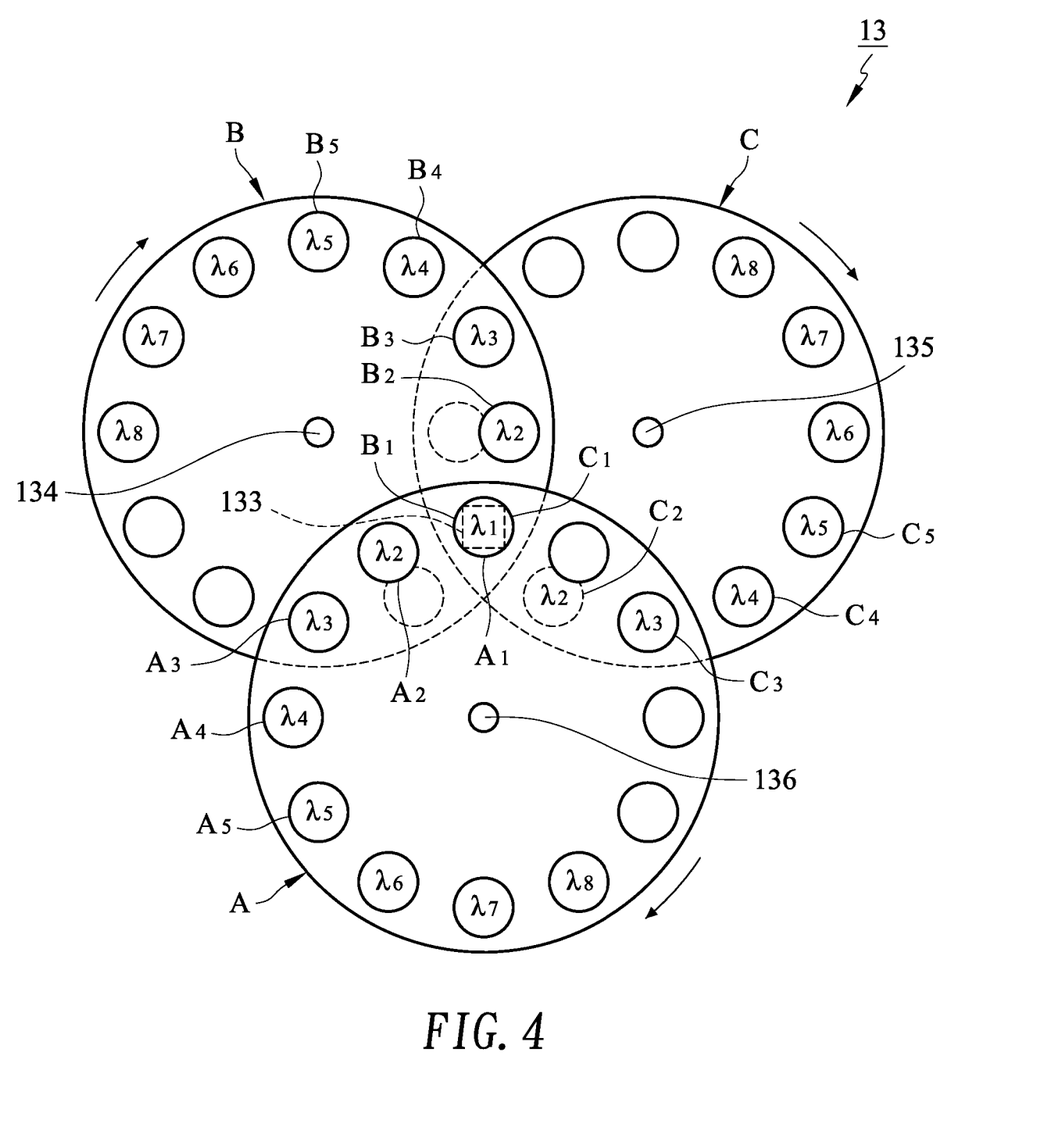
FIG. 4 is a schematic diagram of a filter device in accordance with another embodiment of the present invention.

FIG. 4 shows a filter device 13 in accordance with another embodiment of the invention. In this embodiment, the filter device 13 includes a first wheel A, a second wheel B, and a third wheel C. The three wheels are respectively disposed on a shaft 134, a shaft 135, and a shaft 136. The first wheel A includes a plurality of first filter coatings A1, A2, A3, A4, A5, ..., the second wheel B includes a plurality of second filter coatings B1, B2, B3, B4, B5, ..., and the third wheel includes a plurality of third filter coatings C1, C2, C3, C4, C5, ....

During the period of time, at least one of the first wheel A, the second wheel B, and the third wheel C rotates with time, or all wheels rotate with time and the rotating direction of them can be same or different. In this way, each spectral band is the intersection of at least two of the passband of one of the first filter coatings, the passband of one of the second filter coatings, and the passband of one of the third filter coatings. The spectral imaging device 1 may include a processor (not shown) to control rotations of the first wheel A, the second wheel B, and the third wheel C. Table 2 lists the operation of filter device 13 shown in FIG. 4.

TABLE 2

| Time | T = 1 | T = 2 | T = 3 | T = 4 | T = 5 | ... |
|---|---|---|---|---|---|---|
| Passband of A | $A_{\lambda,1}$ | $A_{\lambda,2}$ | $A_{\lambda,3}$ | $A_{\lambda,4}$ | $A_{\lambda,5}$ | ... |
| Passband of B | $B_{\lambda,1}$ | $B_{\lambda,2}$ | $B_{\lambda,3}$ | $B_{\lambda,4}$ | $B_{\lambda,5}$ | ... |
| Passband of C | $C_{\lambda,1}$ | $C_{\lambda,2}$ | $C_{\lambda,3}$ | $C_{\lambda,4}$ | $C_{\lambda,5}$ | ... |
| A∩B∩C | $A_{\lambda,1} \cap B_{\lambda,1} \cap C_{\lambda,1}$ | $A_{\lambda,2} \cap B_{\lambda,2} \cap C_{\lambda,2}$ | $A_{\lambda,3} \cap B_{\lambda,3} \cap C_{\lambda,3}$ | $A_{\lambda,4} \cap B_{\lambda,4} \cap C_{\lambda,4}$ | $A_{\lambda,5} \cap B_{\lambda,5} \cap C_{\lambda,5}$ | ... |

Figure 5A:
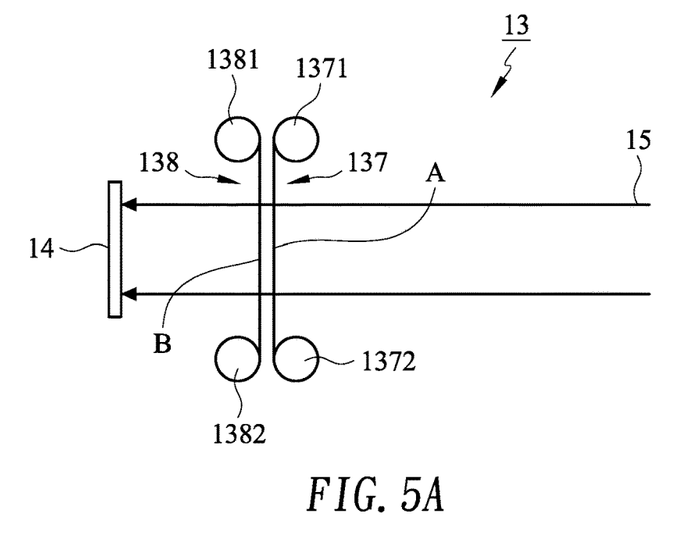
FIGS. 5A and 5B are schematic diagrams of a filter device in accordance with another embodiment of the present invention.

FIG. 5A illustrates a filter device 13 in accordance with another embodiment of the present invention. In this embodiment, the filter device 13 includes a front taping reel 137 and a rear taping reel 138. The front taping reel 137 includes a first front reel 1371, a second front reel 1372, and a carrier tape A. The carrier tape A is wound around the first front reel 1371 and the second front reel 1372, and the carrier tape A can be rolled by the rotation of the first front reel 1371 and the second front reel 1372. The rear taping reel 138 includes a first rear reel 1381, a second rear reel 1382, and a carrier tape B. The carrier tape B is wound around the first rear reel 1381 and the second rear reel 1382. The carrier tape B can be rolled by the rotation of the first rear reel 1381 and the second rear reel 1382.

Figure 5B:
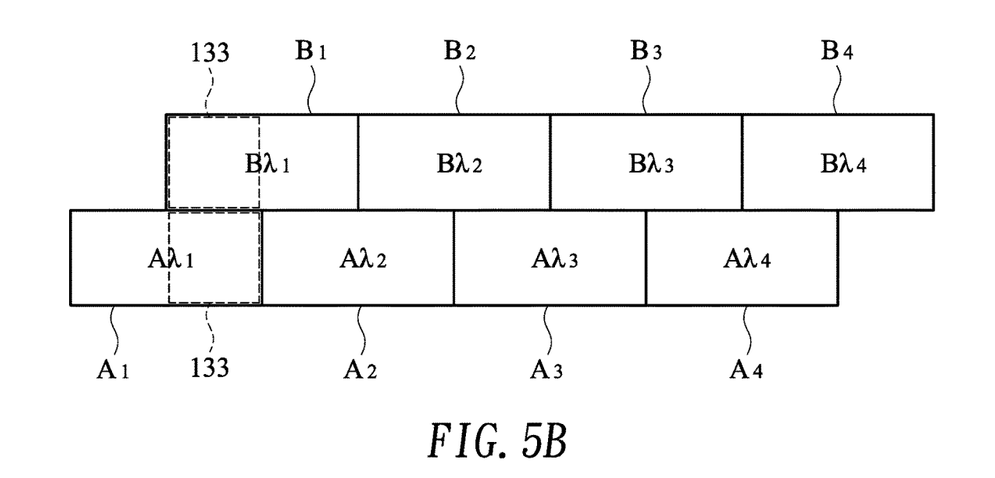

FIG. 5B is a schematic diagram of the carrier tape A and the carrier tape B. Under the perspective of the reflected light 15, the carrier tape A and the carrier tape B overlap. However, in order to clearly show the features, the carrier tape B in the figure is drawn beside the carrier tape A. As shown in FIGS. 5A and 5B, the carrier tape A includes a plurality of first filter coatings A1, A2, A3, A4, and so on. The carrier tape B includes a plurality of second filter coatings B1, B2, B3, B4, and so on. During the period of time, at least one of the front taping reel 137 and the rear taping reel 138 will roll with time. And if both the front taping reel 137 and the rear taping reel 138 roll with time, the rolling directions of them can be the same or different. Thereby, each spectral band is the intersection of the passband of one of the first filter coatings and the passband of one of the second filter coatings. Table 3 lists an operation example of the filter device 13 shown in FIGS. 5A and 5B, in which both the taping reel A and the taping reel B are rolled in the same direction and a half width of a filter coating is rolled per time.

TABLE 3

| Time | T = 1 | T = 2 | T = 3 | T = 4 | T = 5 | ... |
|---|---|---|---|---|---|---|
| Passband of A | $A_{\lambda 1}$ Ex: 397~403 nm | $A_{\lambda 2}$ Ex: 403~409 nm | $A_{\lambda 2}$ Ex: 403~409 nm | $A_{\lambda 3}$ Ex: 409~415 nm | $A_{\lambda 3}$ Ex: 409~415 nm | ... |
| Passband of B | $B_{\lambda 1}$ Ex: 400~406 nm | $B_{\lambda 1}$ Ex: 400~406 nm | $B_{\lambda 2}$ Ex: 406~412 nm | $B_{\lambda 2}$ Ex: 406~412 nm | $B_{\lambda 3}$ Ex: 412~418 nm | ... |
| A∩B | $A_{\lambda 1} \cap B_{\lambda 1}$ Ex: 400-403 nm | $A_{\lambda 2} \cap B_{\lambda 1}$ Ex: 403-406 nm | $A_{\lambda 2} \cap B_{\lambda 2}$ Ex: 406-409 nm | $A_{\lambda 3} \cap B_{\lambda 2}$ Ex: 409-412 nm | $A_{\lambda 3} \cap B_{\lambda 3}$ Ex: 412-415 nm | ... |

Figure 6:
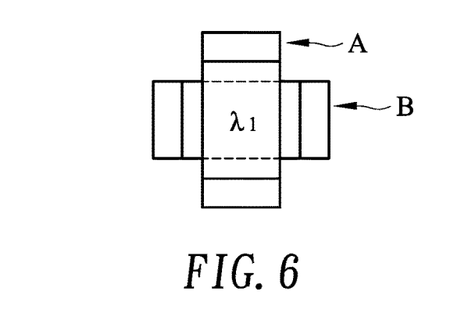
FIG. 6 is a schematic diagram of two carrier tapes in a filter device in accordance with another embodiment of the present invention.

Referring to FIG. 5B, the carrier tape A and the carrier tape B are overlapped and arranged in parallel to each other. FIG. 6 shows a filter device in accordance with another embodiment of the present invention, wherein the carrier tape A is arranged perpendicular to the carrier tape B. In another embodiment of the present invention, the filter device 13 may further comprises a middle taping reel (not shown) including a first middle reel, a second middle reel, and a third carrier tape having a plurality of third filter coatings. The third carrier tape is wound on the first middle reel and the second middle reel. The plurality of first filter coatings, the plurality of second filter coatings, and/or the plurality of third filter coatings are moved during the period of time that the images are captured, such that each spectral band is the intersection of at least two of the passband of one of the first filter coatings, the passband of one of the second filter coatings, and the passband of one of the third filter coatings.

Figure 7:
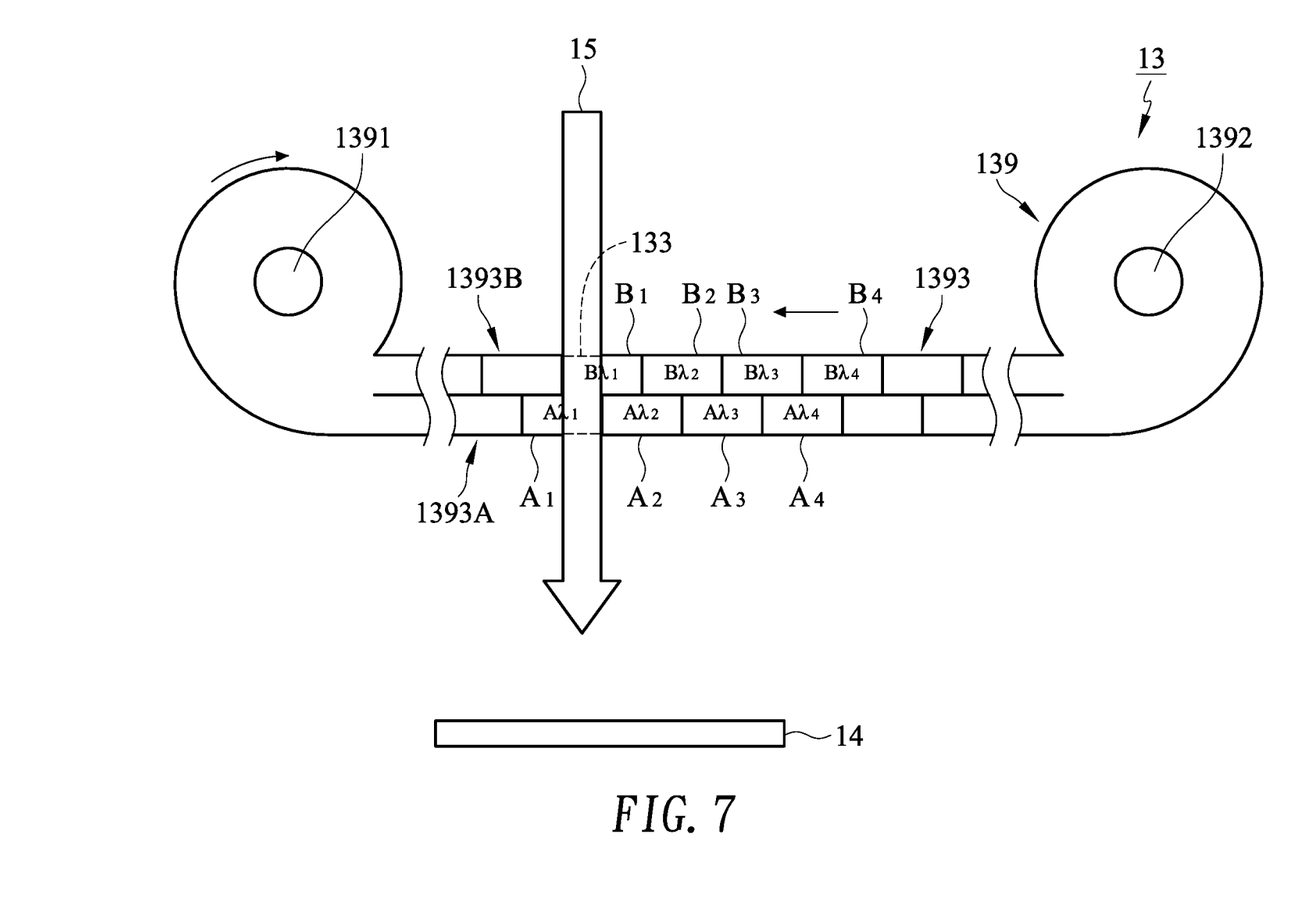
FIG. 7 is a schematic diagram of a filter device in accordance with another embodiment of the present invention.

FIG. 7 shows a filter device 13 in accordance with another embodiment of the present invention. In this embodiment, the filter device 13 comprises a taping reel 139, which includes a first reel 1391, a second reel 1392, and a carrier tape 1393. The carrier tape 1393 is wound on the first reel 1391 and the second reel 1392, and the carrier tape 1393 can be rolled by the rotation of the first reel 1391 and the second reel 1392.

In addition, the carrier tape 1393 includes two overlapping layers (or an overlap of three or more layers), and each layer includes a plurality of filter coatings. For example, the carrier tape 1393 includes a first layer 1393A and a second layer 1393B. The first layer 1393A includes a plurality of first filter coatings A1, A2, A3, A4, etc., and the second layer 1393B includes a plurality of second filter coatings B1, B2, B3, B4, etc. During the period of time that the images are captured, the first reel 1391 and the second reel 1392 will roll with time. Thereby, each spectral band is the intersection of the passband of one of the first filter coatings and the passband of one of the second filter coatings. The spectral imaging device 1 may include a processor (not shown) to control the rotation of the first reel 1391 and the second reel 1392. A half width of the filter coating can be moved at a time.

In some embodiments, the first filter structure and the second filter structure employ optically coating to achieve a narrow band (for example, a bandwidth of 5 nm or 3 nm). In another embodiment, a narrow-band filtering is achieved through a metal nanostructure. In one embodiment, a metal nanostructure described in U.S. patent application Ser. No. 16/711,110 and entitled "SPECTRAL IMAGING DEVICE AND METHOD" is used to achieve the narrow-band filtering. The entire disclosure of which is incorporated herein by reference.

In some embodiments of the present invention, the sensitivity of the image sensor 14 is equal to or less than 0.01 lux. The image sensor 14 is capable of capturing high-resolution color images even in low 0.01 lux condition. With this sensitivity, the image sensor 14 can continuously take multiple high-resolution photos in a very short time with a single exposure. For example, 2000 or more than 2000 photos can be taken during 1 second.

Notice should be made that in some embodiments, the capturing of the N images need not follow in wavelength-ascending order or wavelength-ascending order. The spectral device 1 may include a processor to control an order to capture the images. In addition, taking the two filters 131/132 of FIG. 1C as an example, at a certain time during the period of time that the N images are captured, the reflected light may not pass through anyone of the first filter structures and anyone of the second filter structures. In this case, the processor may instruct the image sensor not to capture the N images. In one embodiment, the processor may instruct the image sensor 14 to capture a background image with the original wavelength range of the light source 10 for reference by the user. In another embodiment, the background image is captured after or before the period of time that the N images are captured.

In one embodiment, two or more images are captured for each spectral band. For example, three images are captured per spectral band, and a total of 3N images are captured during the period of time. The individual pixel intensities of the three images of each spectral band can be obtained by a statistical method, such as averaging the three intensities of individual pixels.

The object 11 can be a solid, a liquid, or a gas that reflects or emits electromagnetic energy in a unique manner. In some embodiments, the processor obtains respective spectra of pixels of the object 11 over the spectral range from the captured N images, and then determines the composition corresponding to the object 11 according to the spectra.

In one embodiment, the spectral camera 1 is used to photograph crops to monitor the growth of the crops. For example, the obtained multi-spectral images can be used to analyze the maturity of the rice and whether it has suffered from pests and diseases. In one embodiment, the spectral imaging device 1 may be installed on the ground or mounted on a drone.

In some embodiments, the captured N images are used to detect whether a specific material is present in the object. This detection typically relies on signature-matching techniques, such as spectral matched filtering for known reference spectra.

In one embodiment, the spectral imaging device 1 is a camera. In another embodiment, the spectral imaging device 1 is a smartphone, which controls the capturing of images of the object 11 through an application program (app) installed in the smartphone. The app can also directly analyze the spectra from the captured images or upload the captured images to a cloud server for spectral analysis. In one embodiment, the spectral imaging device 1 is a microscope capable of capturing images, such as a hyperspectral imaging microscope. By the provided filter device 13, the resolution of spectrum can be greatly improved.

In addition, the spectral analysis can be performed on a small-sized object. For example, the size of the object can be 0.5 μm×0.5 μm. Alternatively, the spectral analysis can be performed on a very small area (such as an area 0.5 μm×0.5 μm) of the object. This is of great help for many applications, such as the test of medical sections. In one embodiment, the filter device 13 is a device independent from the smartphone and is electrically connected to the smartphone. For example, the filter device 1 is disposed on a protective case of a smartphone, and the protective case of the smartphone is electrically connected to the power of the smartphone. The power of the smartphone is used to drive the filter device 13, and the lens module and the image sensor of the smartphone are used to capture images. In some embodiments, the spectral imaging device 1 can upload the captured images to a cloud server or a mobile device (such as a smartphone) for performing spectral analysis through wireless transmission.

The overall size of the spectral imaging device 1 of the present invention is not large. In one embodiment, the total weight of the spectral imaging device 1 is less than or equal to 200 g. In one embodiment, the total weight of the spectral imaging device 1 is less than or equal to 300 g.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A spectral imaging device, comprising:
a light source;
an object;
an image sensor for capturing images of the object; and
a filter device being disposed between the object and the image sensor, the object reflecting the light source to pass through the filter device and to irradiate the image sensor, wherein the filter device comprises:
a first filter having a plurality of first filter structures;
a second filter having a plurality of second filter structures; and
a processor;
wherein during a period of time the image sensor continuously captures N images of the object over a spectral range that is divided into N spectral bands, and each captured image corresponds to one of the spectral bands; and
wherein during the period of time the plurality of first filter structures and/or the plurality of second filter structures are moved, so that each of the plurality of spectral bands is an intersection of a passband of one of the first filter structures and a passband of one of the second filter structures, and a bandwidth of each of the spectral bands is equal to or less than 10 nm; and
wherein the processor obtains respective spectra of pixels of the object over the spectral range from the captured N images, and then determines the composition of the object according to the spectra.

2. The spectral imaging device as recited in claim 1, wherein the light source is an ambient light.

3. The spectral imaging device as recited in claim 1, further comprising a lens module disposed between the object and the filter device.

4. The spectral imaging device as recited in claim 1, further comprising a lens module disposed between the filter device and the image sensor.

5. The spectral imaging device as recited in claim 1, wherein the plurality of first filter structures are a plurality of first filter coatings, and the plurality of second filter structures are a plurality of second filter coatings.

6. The spectral imaging device as recited in claim 1, wherein the plurality of first filter structures are a plurality of first metal nanostructures, and the plurality of second filter structures are a plurality of second metal nanostructures.

7. The spectral imaging device as recited in claim 1, wherein during the period of time when no light passes through one of the plurality of first filter structures and one of the plurality of second filter structures, the processor instructs the image sensor to capture a background image under the light source.

8. The spectral imaging device as recited in claim 1, wherein a bandwidth of each of the spectral bands ranges from 2 nm to 5 nm.

9. The spectral imaging device as recited in claim 1, wherein the first filter is a first wheel and the second filter is a second wheel.

10. The spectral imaging device as recited in claim 9, wherein a rotating direction and a rotating speed of the first wheel are the same as that of the second wheel.

11. The spectral imaging device as recited in claim 9, wherein a rotating direction of the first wheel is opposite to that of the second wheel.

12. The spectral imaging device as recited in claim 9, wherein the filter device further comprises a third wheel including a plurality of third filter structures, and each of the plurality of spectral bands is an intersection of at least two of a passband of one of the first filter structures, a passband of one of the second filter structures, and a passband of one of the third filter structures.

13. The spectral imaging device as recited in claim 1, wherein the first filter is a front taping reel, the second filter is a rear taping reel, and the front taping reel comprises:
a first carrier tape comprising a plurality of first filter coatings;
a first front reel on which the first carrier tape is wound; and
a second front reel on which the first carrier tape is wound;
wherein the rear taping reel comprises:
a second carrier tape comprising a plurality of second filter coatings;
a first rear reel on which the second carrier tape is wound; and
a second rear reel on which the second carrier tape is wound;
wherein during the period of time, the plurality of first filter coatings and/or the plurality of second filter coatings are moved such that each of the spectral bands is an intersection of a passband of one of the first filter coatings and a passband of one of the second filter coatings.

14. The spectral imaging device as recited in claim 13, wherein the filter device further comprises a middle taping reel, which comprises:
a third carrier tape comprising a plurality of third filter coatings;
a first middle reel on which the third carrier tape is wound; and
a second middle reel on which the third carrier tape is wound;
wherein during the period of time, the plurality of first filter coatings, the plurality of second filter coatings, and/or the plurality of third filter coatings are moved such that each of the spectral bands is an intersection of at least two of a passband of one of the first filter coatings, a passband of one of the second filter coating, and a passband of one of the third filter coatings.

15. The spectral imaging device as recited in claim 1, wherein the filter device is a taping reel, which comprises:
a carrier tape comprising the first filter and the second filter, wherein the first filter comprises a plurality of first filter coatings, the second filter comprises a plurality of second filter coatings, and the first filter overlaps the second filter;
a first reel on which the carrier tape is wound; and
a second reel one which the carrier tape is wound;
wherein the plurality of first filter coatings and the plurality of second filter coatings are moved during the period of time, so that each of the spectral bands is an intersection of a passband of one of the first filter coatings and a passband of one of the second filter coatings.

16. The spectral imaging device as recited in claim 1, wherein a sensitivity of the image sensor is equal to or lower than 0.01 lux.

17. The spectral imaging device as recited in claim 1, wherein a total weight of the spectral imaging device is less than or equal to 200 g.

18. The spectral imaging device as recited in claim 1, wherein the spectral imaging device is a microscope.

* * * * *